(12) United States Patent
Hofmann

(10) Patent No.: US 7,980,600 B2
(45) Date of Patent: Jul. 19, 2011

(54) PERMANENT JOINT COMPRISED OF A FITTING, A SLEEVE AND A PIPE, AS WELL AS FITTING FOR FLUID CONDUITS AND A SLEEVE FOR FLUID CONDUIT PIPES

(75) Inventor: Frank Hofmann, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 124 days.

(21) Appl. No.: 12/363,093

(22) Filed: Jan. 30, 2009

(65) Prior Publication Data

US 2009/0263186 A1 Oct. 22, 2009

(30) Foreign Application Priority Data

Feb. 1, 2008 (DE) .................. 10 2008 007 447

(51) Int. Cl.
*F16L 21/06* (2006.01)
(52) U.S. Cl. ........................ 285/323; 285/322
(58) Field of Classification Search .............. 285/257, 285/323, 324, 322, 305
See application file for complete search history.

(56) References Cited

U.S. PATENT DOCUMENTS

| | | | | |
|---|---|---|---|---|
| 1,358,633 A * | 11/1920 | Hachmann | ............ | 285/257 |
| 1,738,969 A * | 12/1929 | Selah | ............ | 285/323 |
| 1,886,413 A * | 11/1932 | Metcalf, Jr. | ............ | 285/323 |
| 2,032,416 A * | 3/1936 | Hunt | ............ | 285/323 |
| 3,232,648 A * | 2/1966 | Franck | ............ | 285/322 |
| 4,005,884 A * | 2/1977 | Drori | ............ | 285/323 |
| 4,431,216 A * | 2/1984 | Legris | ............ | 285/323 |
| 4,632,435 A | 12/1986 | Polyak | | |
| 5,230,539 A * | 7/1993 | Olson | ............ | 285/323 |
| 5,407,236 A * | 4/1995 | Schwarz et al. | ............ | 285/322 |
| 5,782,501 A * | 7/1998 | Brandt | ............ | 285/322 |
| 5,921,588 A * | 7/1999 | Vogel et al. | ............ | 285/322 |
| 6,170,887 B1 * | 1/2001 | Salomon-Bahls et al. | ..... | 285/322 |
| 6,199,920 B1 * | 3/2001 | Neustadtl | ............ | 285/322 |
| 6,254,144 B1 * | 7/2001 | Hagan | ............ | 285/323 |
| 6,554,323 B1 * | 4/2003 | Salomon-Bahls et al. | ..... | 285/322 |
| 6,877,781 B2 * | 4/2005 | Edler | ............ | 285/323 |
| 7,100,950 B2 * | 9/2006 | Martin | ............ | 285/323 |
| 7,195,286 B2 * | 3/2007 | Hama | ............ | 285/322 |
| 7,380,838 B2 * | 6/2008 | Paluncic | ............ | 285/323 |
| 7,677,610 B2 * | 3/2010 | Schwarz et al. | ............ | 285/322 |
| 7,690,695 B2 * | 4/2010 | Duquette et al. | ............ | 285/322 |

FOREIGN PATENT DOCUMENTS

| | | |
|---|---|---|
| DE | 40 10 130 A1 | 10/1991 |
| DE | 297 06 377 U1 | 6/1997 |
| GB | 2 107 814 A | 5/1983 |

* cited by examiner

*Primary Examiner* — David E Bochna
(74) *Attorney, Agent, or Firm* — Proskauer Rose LLP

(57) ABSTRACT

A permanent joint includes a fitting, a sleeve, and a pipe. The fitting exhibits a base body, an outer body and a supporting body, wherein the outer body and supporting body form a groove between them, the inner peripheral surface of the outer body exhibits at least one latching groove, and the outer peripheral surface of the supporting body exhibits a sealing surface inclined relative to the axis of the fitting. The sleeve exhibits at least one latching projection arranged on the outer peripheral surface and at least one open slit running in the axial direction, wherein at least one fixing projection is arranged on the inner peripheral surface in the area of the latching projection. The sleeve embraces a pipe end under a pre-stress, wherein the pipe end with the sleeve engages into the groove under a pre-stress, and the latching groove and latching projection create a frictional connection.

7 Claims, 7 Drawing Sheets

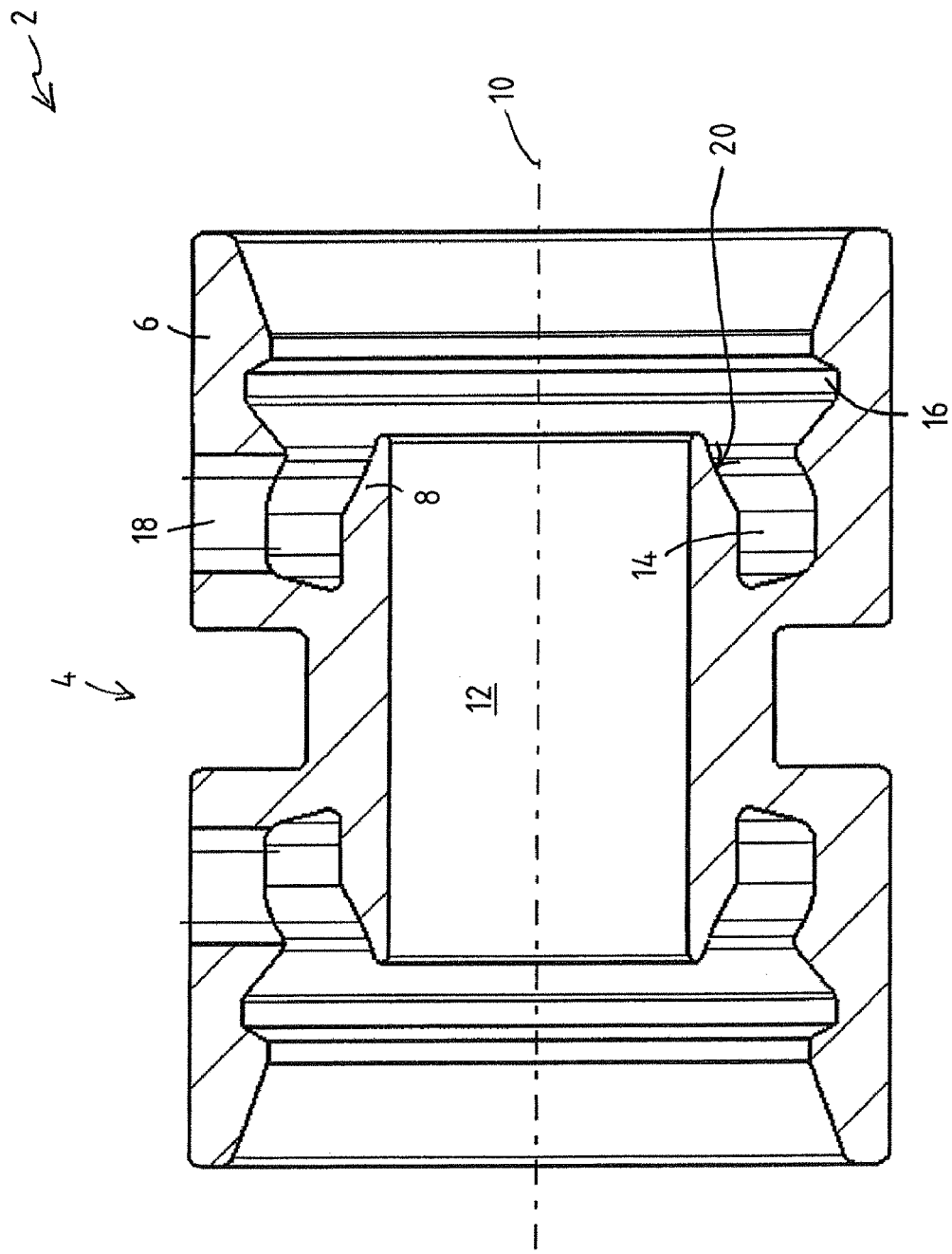

PERMANENT JOINT COMPRISED OF A FITTING, A SLEEVE AND A PIPE, AS WELL AS FITTING FOR FLUID CONDUITS AND A SLEEVE FOR FLUID CONDUIT PIPES

CROSS-REFERENCE TO RELATED APPLICATIONS

This application claims the benefit of and priority to German patent application no. DE 10 2008 007 447.0-24, filed on Feb. 1, 2008. The disclosure of the above application is incorporated herein by reference in its entirety.

FIELD OF THE INVENTION

The invention relates to a fitting for fluid conduits with a base body, an outer body and a supporting body, wherein the outer body and the supporting body form a groove between them. The invention further relates to a sleeve for fluid conduit pipes with at least one latching projection arranged on the outer peripheral surface, and with at least one open slit running in an axial direction. In addition, the invention relates to a permanent joint with a fitting for fluid lines, a sleeve for fluid conduit pipes and a pipe.

BACKGROUND

Fittings known from prior art exhibit supporting bodies which, on the outer peripheral surface, exhibit a continuous groove, in which a gasket element, for example a sealing O-ring, can be arranged. In order to join a pipe with the fitting, a pipe end is placed on the supporting body, so that the supporting body engages into the pipe. The outer diameter of the supporting body and the inner diameter of the pipe are here preferably adapted to each other. The tightness of the connection is caused by the preferably resilient gasket element projecting out of the groove, which is compressed between the inner peripheral surface of the pipe and the groove of the supporting body, so that it tightly abuts the two surfaces.

However, the flow cross section of the pipe is narrowed at the joining site between the pipe and the fitting by the engagement of the supporting body into the pipe. For example, this can impair the flow behavior of a fluid by generating turbulences and/or a pressure drop of the pressurized fluid at the joining site. In addition, the provision of a gasket element as an extra, in particular movable element increases the caution a user must exercise in manufacturing the permanent joint.

In order to avoid the aforementioned disadvantages, use could be made of a fitting that exhibits an outer body. The inner diameter of the outer body and outer diameter of the pipe are in this case adapted to each other, so that the outer body of the fitting embraces a pipe end. In such a fitting, the seal could be established between the inner peripheral surface of the outer body and outer peripheral surface of the pipe by arranging an O-ring in a continuous groove situated on the inner peripheral surface of the outer body. This made it possible to minimize a narrowing of the flow cross section of the pipe by making the supporting body smaller, or even to completely avoid said narrowing by omitting the supporting body.

However, this type of seal is not suitable for composite pipes, which exhibit several layers of different materials bonded together, sometimes with adhesive. A fluid carried in the pipe or, respectively, the fitting can come into contact with or, respectively, wet the facing edge of the pipe end at which the joining sites of the materials of the composite pipe are exposed, thereby potentially impairing the cohesion of individual layers of the composite pipe, for example through moistening, and hence tightness as well.

SUMMARY OF THE INVENTION

In general, one aspect of the invention is to provide a permanent joint that ensures a reliable seal, in particular relative to pressurized fluids, and avoids the aforementioned disadvantages, as well as suitable fittings and sleeves for such a permanent joint.

A fitting for fluid conduits, in accordance with this aspect, exhibits a base body, an outer body and a supporting body, wherein the outer body and the supporting body form a groove between them, the inner peripheral surface of the outer body exhibits at least one latching groove, and the outer peripheral surface of the supporting body exhibits a sealing surface inclined relative to the axis of the fitting.

A sleeve for fluid conduit pipes, also in accordance with this aspect, exhibits at least one latching projection arranged on the outer peripheral surface and at least one open slit running in the axial direction, wherein at least one fixing projection is arranged on the inner peripheral surface in the area of the latching projection.

A permanent joint with a fitting for fluid conduits, in accordance with this aspect, exhibits a base body, an outer body and a supporting body, wherein the outer body and the supporting body form a groove between them, wherein the inner peripheral surface of the outer body exhibits at least one latching groove, and the outer peripheral surface of the supporting body exhibits a sealing surface inclined relative to the axis of the fitting, with a sleeve for fluid conduit pipes, which exhibits at least one latching projection arranged on the outer peripheral surface and at least one open slit running in the axial direction, wherein at least one fixing projection is arranged on the inner peripheral surface in the area of the latching projection, and with a pipe, wherein the sleeve embraces a pipe end under a pre-stress, wherein the pipe end with the sleeve engages into the groove under a pre-stress, the latching groove and the latching projection create a frictional connection, the supporting body is molded at least partially molded into the inner peripheral surface of the pipe, and the fixing projections are molded into the outer peripheral surface of the pipe.

The advantages of the permanent joint according to the invention, of the fittings according to the invention and of the sleeve according to the invention become evident from the following description of the permanent joint manufacturing process.

The sleeve is slipped onto a pipe end with the slit end first. The outer diameter of the pipe is here preferably slightly greater than the inner diameter of the sleeve. The sleeve can be expanded by means of the open slits, thereby embracing the pipe end. Due to the pre-stress generated by the expansion process the fixing projections arranged on the inner peripheral surface slightly against the outer peripheral surface are pressed of the pipe, and possibly slightly tear the edge of the latter during the slip-on process. In addition, the pre-stress of the sleeve on the pipe end stabilizes the position of the sleeve at the pipe end, thereby preventing the sleeve from unintentionally slipping off the pipe.

The pipe end embraced by the sleeve is now introduced into the groove formed between the outer body and supporting body of the fitting in essentially an axial direction by pressure application. The thickness of the combination formed by the sleeve and pipe here is preferably larger than the width of the groove. To enable the pipe end embraced by the sleeve to engage into the groove, the supporting body is at least partially molded into the inner peripheral surface of the pipe. Therewith, the inside of the pipe end is slightly expanded. As a result, the sealing surface inclined relative to the axis of the fitting tightly abuts the expanded inner peripheral surface of the pipe end, and can hence ensure an effective seal for the inside of the pipe or, respectively, the fitting relative to the environment.

For example, this also makes it possible to prevent a fluid carried in the pipe or, respectively, the fitting from getting into contact with the facing edge of a composite pipe. This is why the fitting, the sleeve and the permanent joint are especially suitable for use with composite pipes. In addition, the narrowing of the flow cross section of the pipe caused by the supporting body is at least reduced by the at least partially molding of the supporting body into the inner peripheral surface of the pipe. The probability of turbulences and/or a pressure drop at the joining site between the pipe and the fitting is at the very least diminished in this way. Of course, the supporting body can also be molded into the inner peripheral surface of the pipe to a point where no cross sectional narrowing arises.

The sealing surface can be designed as the surface of a conical segment, wherein the conical radius from the distal end toward the proximal end of the supporting body enlarges over a specific section. The radius change can also be present over the entire axial extension of the supporting body. In this way, the inner peripheral surface of the pipe end can glide upwards the surface during the axial introduction or expansion process, respectively. An advantage of a conical segment surface is its comparatively simple feasibility from a technical standpoint. However, it is also conceivable to make the sealing surface curved or bent relative to the axis of the fitting. As a result, the forces acting on the inner peripheral surface of the pipe end during the expansion process can be better adjusted to the materials of the supporting body and the pipe.

The pre-stress of the pipe end in the groove generated by the forming of the pipe interior is maintained via the insertion of the latching projection arranged on the outer peripheral surface of the sleeve in the latching groove arranged on the inner peripheral surface of the outer body. During the axial introduction process, the latching projection is pressed against the inner peripheral surface of the outer body. Since the fixing projection is arranged at the inner peripheral surface of the sleeve in the area of the latching projection, the fixing projection that before only slightly teared at the outer peripheral surface of the pipe is preferably driven completely into the outer peripheral surface of the pipe by the pressure on the latching projection, and hence anchored therein. This yields a permanent and stable joint between the sleeve and the pipe end.

The pipe end that engages into the groove under a pre-stress and is embraced by the sleeve can hence not be pressed out of the groove, since the sleeve is held by the latching projection engaging into the latching groove, and the pipe is permanently joined with the sleeve via the fixing projections, thereby avoiding an unintended axial movement out of the groove formed between the outer body and the supporting body.

In an embodiment, the thickness of the outer body increases radially inward between its distal end and the latching groove. This facilitates the process of introducing the pipe end embraced by the sleeve into the fitting, since this narrowing of the cross section of the outer body guides the pipe end toward the groove formed between the outer body and the supporting body. In addition, the pressure exerted by the outer body on the latching projection of the sleeve, which drives the fixing projections of the sleeve into the outer peripheral surface of the pipe and hence brings about the permanent joint between the pipe and the sleeve, can be continually increased until the latching projection engages into the latching groove of the outer body.

The outer body preferably projects over the supporting body in an axial direction. In this way, the stability of the outer body can be increased, which in particular supports the function of the outer body as an abutment against the latching projection, which anchors the fixing projections in the outer peripheral surface of the pipe. The axial dimensions of the outer body make it possible to incorporate other structural configurations in the fitting. For example, the outer body can conceivably be provided with an oblong hole. The oblong hole preferably extends in an axial direction, and is preferably arranged at the proximal end of the outer body in the area of the base body. One view through the oblong hole lets a user of the fittings confirm whether the pipe end embraced by the sleeve has been introduced into the groove up to the recommended, in some cases prescribed, position.

In another advantageous embodiment, the base body and the supporting body are constructed as two parts. This makes it possible to adjust the fitting, in particular to composite pipes that exhibit layers of various materials. It is especially preferred for the material of the supporting body to match the material of the pipe or, in the case of a composite pipe, the material of the inner layer of the pipe. For example, if the composite pipe has an inner layer consisting of a metal material, such as copper, red bronze or high-grade steel, the supporting body can also be made of the same metal material, e.g., copper, red bronze or high-grade steel, while the base body is generally comprised of plastic. This makes it possible in particular to improve the compatibility between the supporting body and the material of the pipe or the inner layer of the pipe, respectively.

In another advantageous embodiment, the end of the sleeve facing away from the slit end can exhibit at least one opening. The opening allows a user to check the recommended, in some cases prescribed seat of the sleeve on the pipe end. This check can also be performed once the pipe end embraced by the sleeve was introduced into the fitting, provided that the opening on the sleeve is aligned with an oblong hole in the outer body of the fitting so as to at least partially overlap. As a result, the check can also be performed on an already manufactured, permanent joint.

In addition, the slit end of the sleeve preferably exhibits a flange-like projection on the outer peripheral surface. In this way, in particular the position of the pipe end embraced by the sleeve for insertion into the fitting can be limited in an axial direction directed along the insertion process of the pipe. For example, this allows a user to detect the correct insertion position by the abutment of the flanged projection at the facing edge surface of the outer body aligned perpendicular to the axis. In some cases, it may be sufficient to just have contact between the facing edge surface and the flanged projection.

It is further possible to form the end of the sleeve facing away from the slit end angled radially inward, in particular by an angle of 90°. As a result, the position of the sleeve slipped onto the pipe end can be axially limited in one direction. In this way, the sleeve can be prevented from being pushed further onto the pipe than necessary or expedient.

BRIEF DESCRIPTION OF THE DRAWINGS

The invention will be described in greater detail below based on exemplary embodiments depicted in a drawing. The drawing shows:

FIG. 1*a-b* an exemplary embodiment of a fitting according to the present invention in a cross sectional view and in an isometric view;

DESCRIPTION

Figure 1B:
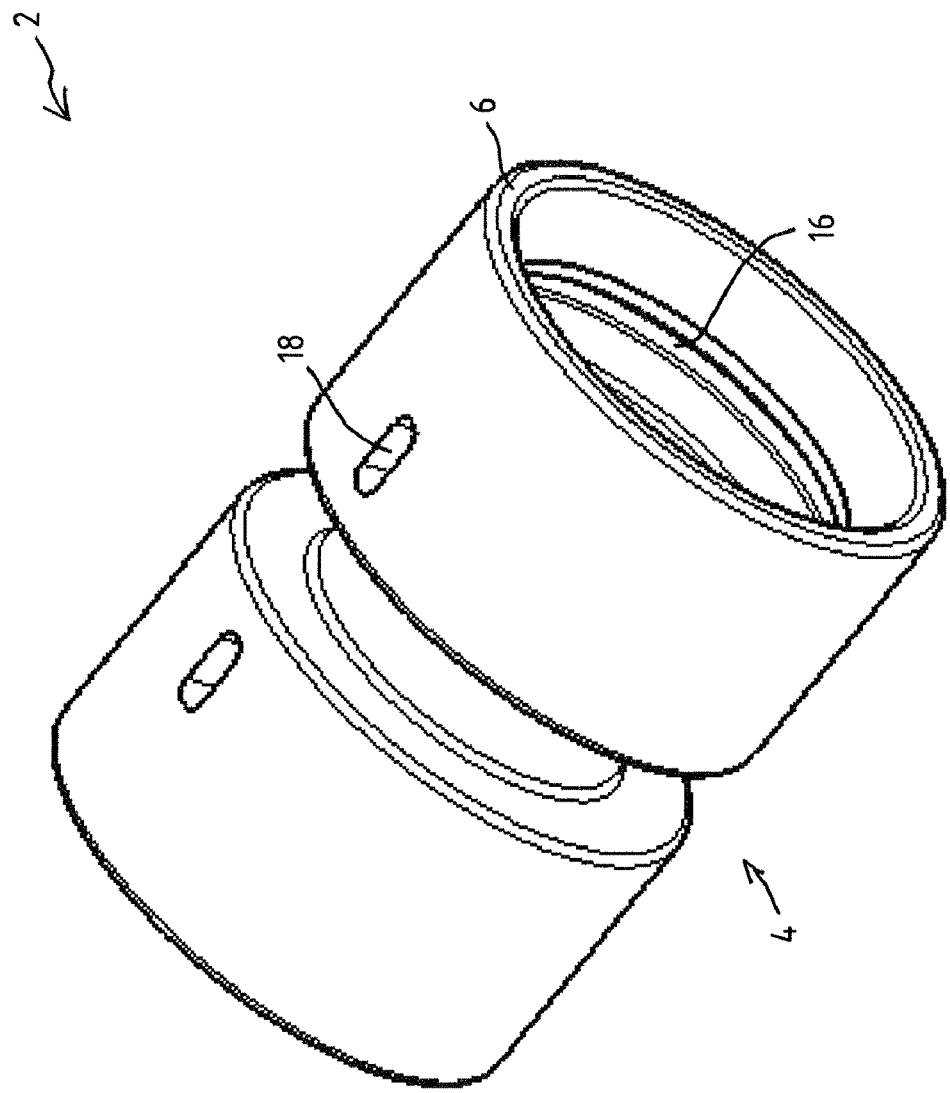

The exemplary embodiment in FIG. 1*a* shows a fitting 2 according to the present invention in a cross sectional view. In this example, an outer body 6 and a supporting body 8 extend from a base body 4 in an axial direction 10. The inner peripheral surface of the supporting body 8 limits a flow-through area 12 of the fitting 2. A groove 14 is formed between the outer body 6 and the supporting body 8 to accommodate a pipe end (not shown). The exemplary fitting 2 from FIG. 1*a* has two mirror symmetrical connection areas. In this way, two pipes can be permanently joined with the fitting 2 at opposite sides. However, the configuration is not limited to this form. It is also conceivable to provide just one connection area on the fitting 2, and design the remaining parts of the fitting 2 in such a way as to make them suitable for connection to valves, spigots or similar fittings, or for integrated design with valves, spigots or similar fittings, respectively.

In this example, the outer body 6 projects over the supporting body 8 in axial direction 10. A continuous latching groove 16 is arranged on the inner peripheral surface of the outer body 6. The proximal end of the outer body 6 further exhibits an oblong hole 18, through which the groove 14 can be inspected from outside. In principle, the outer body 6 can also be provided with a plurality of oblong holes 18. The thickness of the outer body 6 increases radially inward between its distal end and the latching groove 16, resulting in a slight cross sectional narrowing.

The outer peripheral surface of the supporting body 8 exhibits a sealing surface 20, which in this example is inclined at a fixed angle relative to the axis 10 of the fitting 2, and designed as a surface of a conical segment. However, it is also conceivable for the sealing surface 20 to be bent or curved, if this is useful for the later use of the fitting 2 as part of a permanent joint with other components.

The exemplary embodiment of the fitting 2 shown on FIG. 1*a* is constructed as a single piece, and preferably is made out of plastic. However, it is also possible to use other materials, such as copper, red bronze or high-grade steel for fabricating the fitting 2. In particular, the fitting 2 can be constructed as multiple parts using different materials for the individual bodies.

FIG. 1*b* shows an isometric view of the fitting 2 corresponding to the depiction on FIG. 1*a*.

Figure 2A:
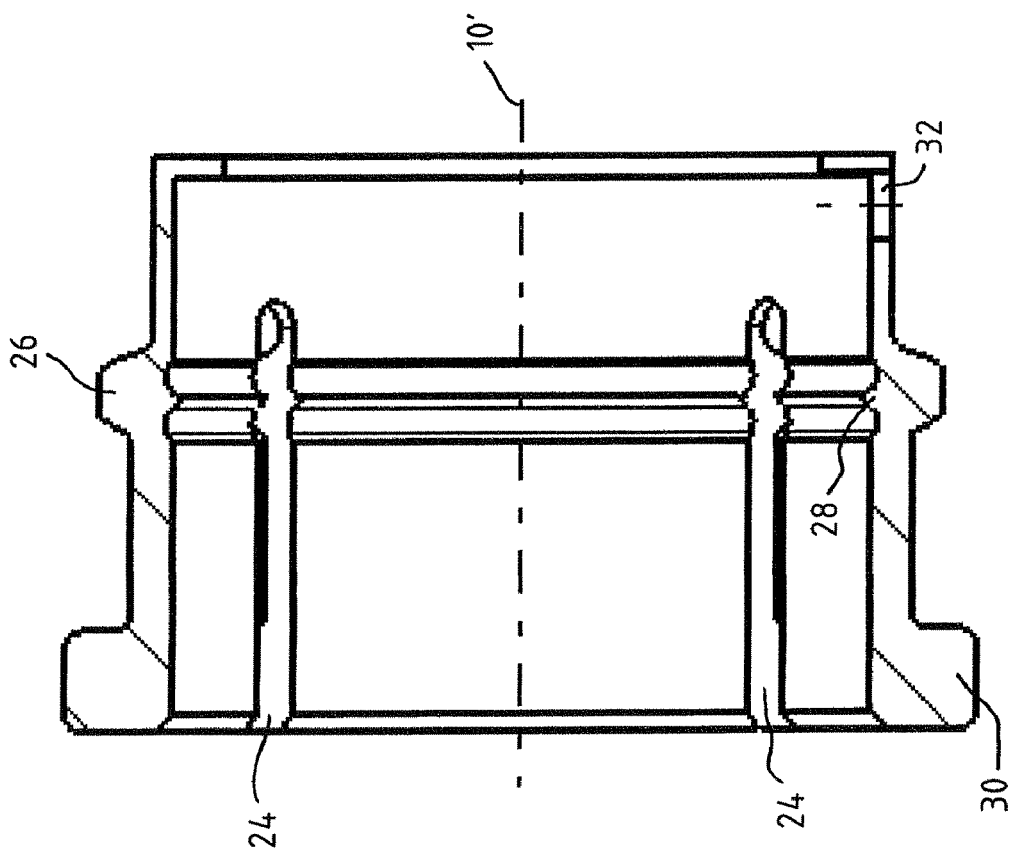
FIG. 2*a-b* an exemplary embodiment of a sleeve according to the present invention in a cross sectional view and in an isometric view.

The exemplary embodiment in FIG. 2*a* shows a sleeve 22 according to the present invention in a cross sectional view. The sleeve 22 is essentially annular, and exhibits four slits 24 that run in an axial direction 10', and are open to one side. The slits 24 make it possible to expand the inner cross section of the sleeve 22 on one side. In this way, the sleeve 22 can be slipped onto a pipe (not shown), even if the outer diameter of the pipe is slightly larger relative to the inner diameter of the sleeve 22. Any number of slits 24 can basically be selected.

The outer peripheral surface of the sleeve 22 exhibits a latching projection 26, which is suitable for engaging into the latching groove 16 of the fitting 2 described above. A fixing projection 28, which in this example is continuous, is arranged in the area of the latching projection 26 on the inner peripheral surface of the sleeve 22. However, several individual, separate fixing projections 28 are basically possible as well. The slit end of the sleeve 22 further exhibits a flange-like projection 30 on the outer peripheral surface, with which the depth to which the sleeve 22 engages into the fitting 2 can be determined, for example. In addition, the end of the sleeve 22 facing away from the slit end is angled radially inward by 90° in this example. This generates abutment points or an abutment surface for a pipe end (not shown). An opening 22, which enables a view inside the sleeve 22, is provided at the end of the sleeve 22 facing away from the slit end. This is practical in cases where the sleeve 22 is already sitting on a pipe end. However, it is further conceivable to provide more than one opening 32 on the sleeve 22.

The sleeve 22 can be made of a plastic. However, other materials can also be used.

Figure 2B:
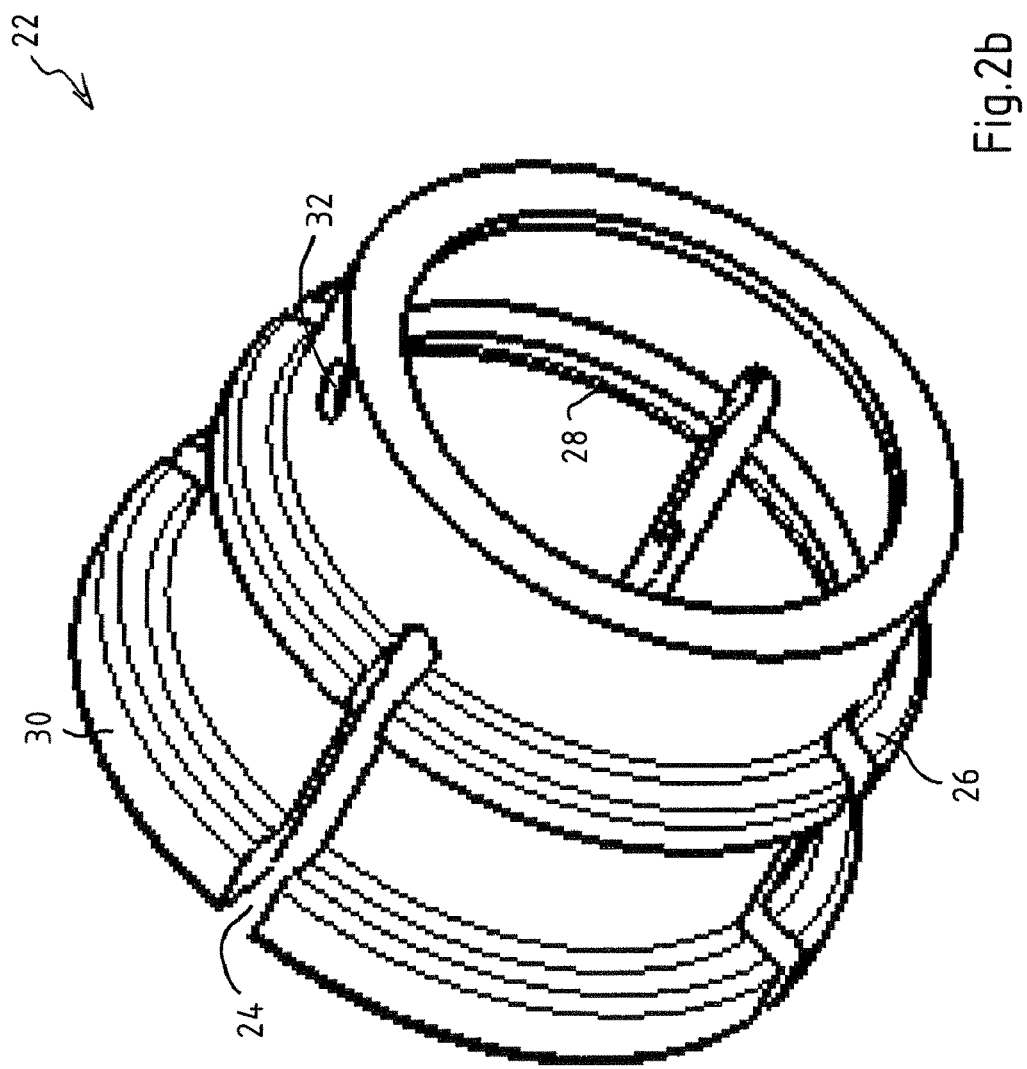

FIG. 2*b* shows an isometric view of sleeve 22 corresponding to the depiction on FIG. 2*a*.

Figure 3A:
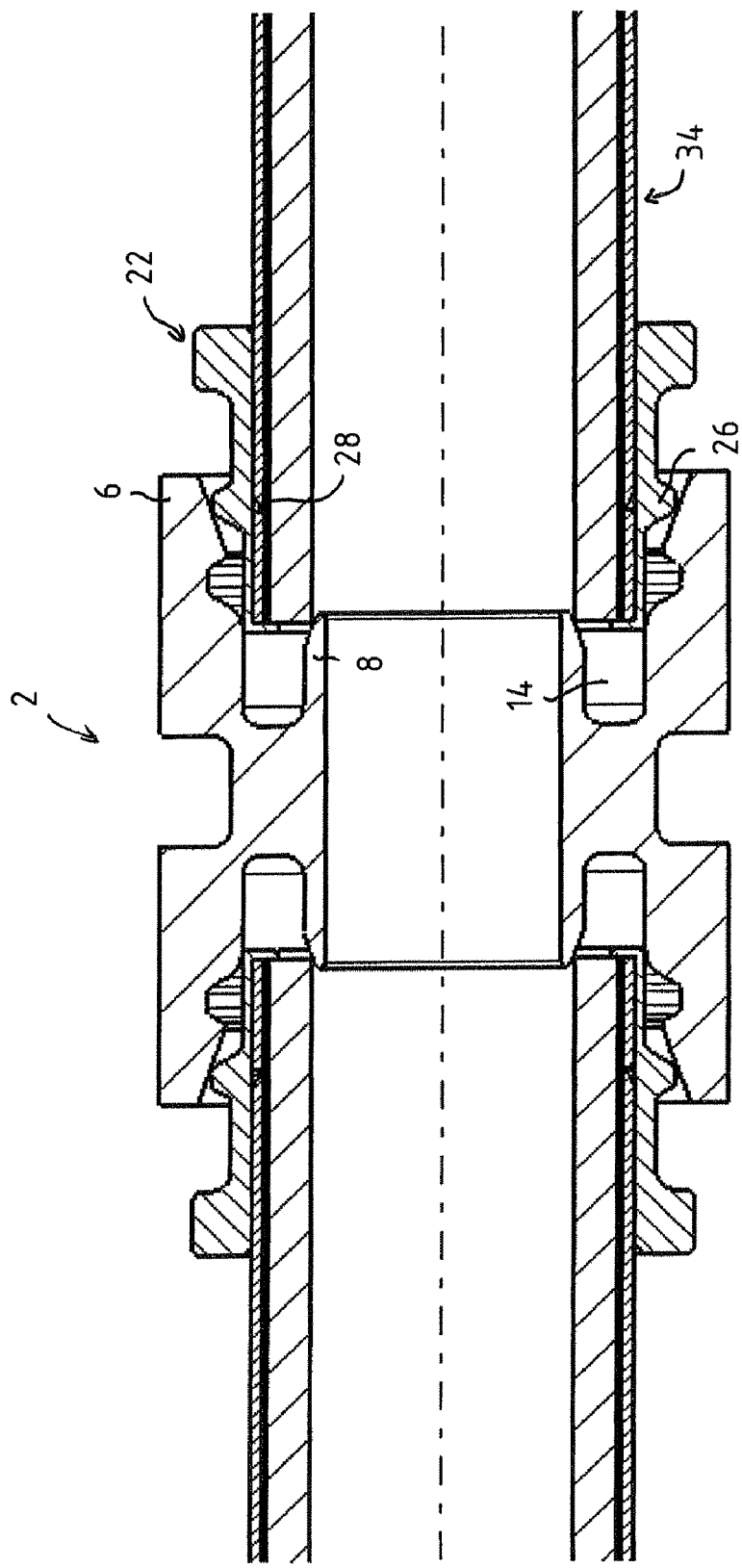
FIG. 3*a-b* an exemplary embodiment of a fitting, a sleeve and a pipe for making of a permanent joint according to the present invention, before and after the compression process.

The exemplary embodiment on FIG. 3*a* shows a fitting 2 and a sleeve 22 according to the present invention, along with a composite pipe 34, before a permanent joint has been established between these three components. The composite pipe 34 exhibits three layers in this example.

The sleeve 22 is placed on the end of the pipe 34 with the slit end in front. Thereby, the sleeve 22 is slightly expanded, so that the resultant pre-stress presses the fixing projection 28 arranged on the inner peripheral surface of the sleeve 22 against the outer peripheral surface of the pipe 34. This makes it possible to ensure a stable position of the sleeve 22 on the pipe end. The danger of the sleeve 22 unintentionally slipping from the pipe 34 is thereby diminished.

In this example, the sleeve 22 is pushed so far onto the pipe 34 until an outer section of the facing end surface of the pipe end abuts the angled end of the sleeve 22. In this way, a defined position can be established for the sleeve 22 relative to the pipe 34.

In FIG. 3*a*, the pipe end embraced by the sleeve 22 is introduced into the fitting 2 until the outer region of the supporting body 6 comes into contact with the inner edge of the pipe 34, and the latching projection 26 on the outer peripheral surface of the sleeve 22 comes into contact with the inclined inner peripheral surface of the outer body 6 in the area of its distal end. This is the positioning of the components to each other just before the pipe end embraced by the sleeve 22 is introduced into the groove 14 formed between the outer body 6 and supporting body 8 through exposure to pressure, thereby fabricating the permanent joint.

Figure 3B:
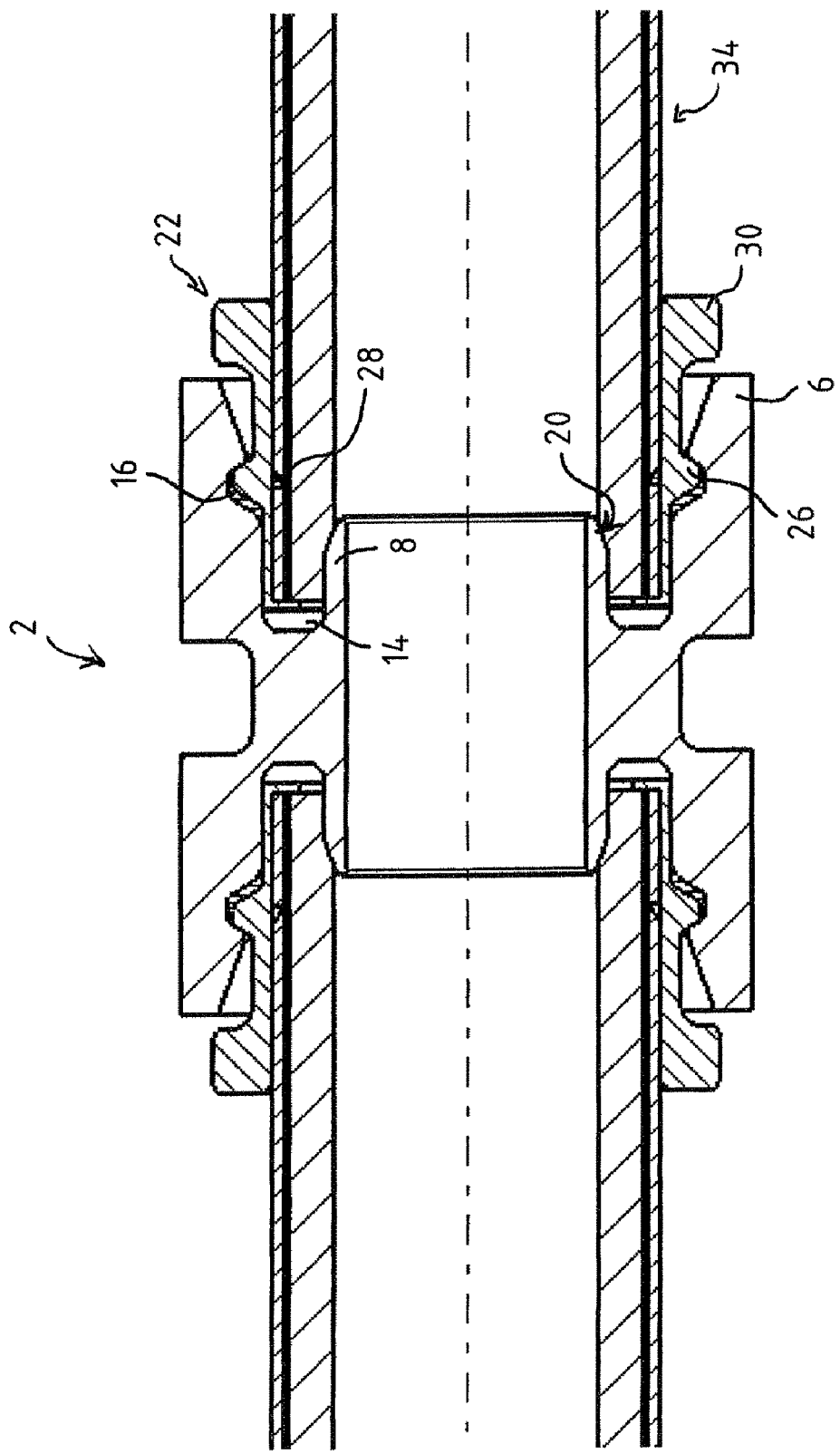

In continuation of the example from FIG. 3*a*, FIG. 3*b* shows the fitting 2, the sleeve 22 and the composite pipe 34 after the compression process, i.e. after the permanent joint has been fabricated.

During the further introducing process of the pipe end embraced by the sleeve 22 into the groove 14 through exposure to pressure, the supporting body 8 is at least partially molded into the inner peripheral surface of the composite pipe 34. As a result, the sealing surface 20 tightly abuts the formed inner peripheral surface of the pipe 34, and seals the permanent joint relative to the fluids (not shown) carried in the pipe 34 or in the fitting 2, respectively. Additional gasket elements like O-rings are not necessary to establish the seal. Further, this configuration of the seal makes it impossible for a fluid to come into contact with potentially exposed facing edges of the composite pipe 34, thereby impairing it.

Therefore, not just the tightness of the permanent joint is ensured in a simple and economical fashion, but the cross sectional narrowing that arises at the transition from the pipe 34 to the fitting 2 is also diminished, thereby at least weakening a potentially arising source of turbulences and/or pressure drops. It is basically also conceivable to mold the supporting body 8 completely into the inner peripheral surface of the pipe 34, which would completely avoid any cross sectional narrowing.

The fitting 2 and the inner layer of the composite pipe 34 advantageously consist of the same material, for example a plastic. This ensures optimal compatibility between the components of the permanent joint.

In addition, the latching projection 26 arranged on the outer peripheral surface of the sleeve 22 is pressed through the outer body 6 as an abutment against the outer peripheral surface of the pipe 34 during the introduction process. As a consequence, the fixing projection 28 in the outer peripheral surface of the pipe 34 is anchored securely in place, thereby yielding a permanent joint between the pipe 34 and sleeve 22. At the completion of the axial compression process, the latching projection 26 arranged on the outer peripheral surface of the sleeve 22 latches into the latching groove 16 arranged on the inner peripheral surface of the outer body 6, so that the pipe end embraced by the sleeve 22 cannot be axially removed from the groove 14 formed between the outer body 6 and supporting body 8.

The permanent joint is hereby established. The latching projection 26 engaged into the latching groove 16 prevents any axial movement of the pipe 34 out of the fitting 2. In this example, the dimensions of the groove 14 prevent the pipe 34 from axially moving further into the groove 14. However, it is also possible to determine the axial position of the pipe 34 engaging into the groove 14 using the flange-like projection 30 arranged at the slit end of the sleeve 22, which comes to abut at least one section of the facing edge surface of the outer body 6.

Figure 4:
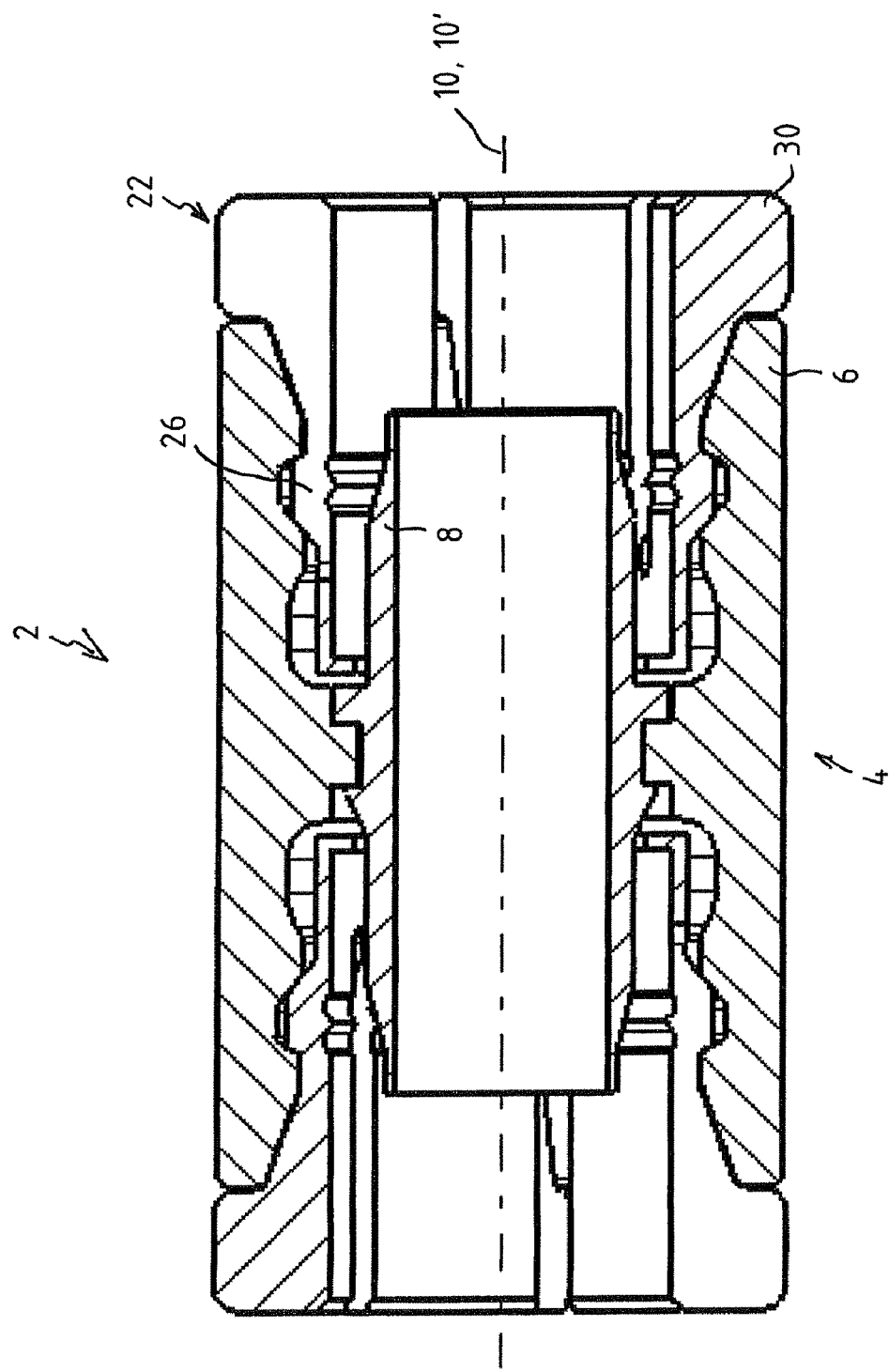
FIG. 4 another exemplary embodiment of a fitting and a sleeve for making of a permanent joint with a pipe according to the present invention after the compression process.

The exemplary embodiment in FIG. 4 shows a cross sectional view of a two-part fitting 2 into which a sleeve 22 is introduced. The pipe in FIG. 4 is not shown to provide better clarity. The sleeve 22 in FIG. 4 differs from the sleeve 22 in FIG. 2a or, respectively, 3a and 3b in that the thickness of the sleeve 22 diminishes between the flange-like projection 30 on the outer peripheral surface of the slit end of the sleeve 22 and the latching projection 26. The resultant outer peripheral surface inclined relative to the axis 10, 10' of the sleeve 22 is adjusted to the inner peripheral surface of the outer body 6 of the fitting 2 in the area of its distal end, thereby enabling a planar abutment between the two sections after the compression process. In this way, the axial positions of the sleeve 22 and of the fitting 2 to each other can be secured.

In this example, the supporting body 8 of the fitting 2 consists of a different material than the outer body 6 and parts of the base body 4. For example, the supporting body 8 can be made out of a metal material, such as copper, red bronze or a high-grade steel, whereas parts of the base body 4 as well as the outer body 6 are comprised of a plastic. This configuration is especially advantageous when the fitting 2 is provided to establish a permanent joint with a composite pipe 34, which exhibits an inner layer made of a material corresponding to the material of the supporting body 8. In this case, the inner layer of the composite pipe 34 would preferably also consist of copper, red bronze or a high-grade steel.

The invention claimed is:

1. A permanent joint
   with a fitting for fluid conduits, which exhibits a base body, an outer body and a supporting body, wherein the outer body and the supporting body form a groove between them, wherein the outer body exhibits at least one latching groove on an outer body inner peripheral surface, and wherein the supporting body exhibits a sealing surface inclined relative to an axial direction of the fitting on a supporting body outer peripheral surface;
   with a sleeve for fluid conduit pipes, which exhibits at least one latching projection arranged on a sleeve outer peripheral surface and at least one open slit running in an axial direction of the sleeve, wherein at least one fixing projection is arranged on a sleeve inner peripheral surface in an area of the latching projection, and
   with a pipe,
   wherein the sleeve embraces a pipe end face under a prestress,
   wherein the pipe end with the sleeve engages into the groove under a pre-stress,
   wherein the latching groove and the latching projection create a frictional connection,
   wherein the supporting body is at least partially molded into an inner peripheral surface of the pipe, and
   wherein the fixing projections are molded into an outer peripheral surface of the pipe.

2. The permanent joint according to claim 1, wherein an end of the sleeve facing away from a slit end exhibits at least one opening.

3. The permanent joint according to claim 1, wherein a slit end of the sleeve exhibits a flange-like projection on the sleeve outer peripheral surface.

4. The permanent joint according to claim 1, wherein an end of the sleeve facing away from a slit end is angled radially inward.

5. The permanent joint according to claim 1, wherein the thickness of the outer body enlarges radially inward between a distal end of the outer body and the latching groove.

6. The permanent joint according to claim 1, wherein the outer body projects over the supporting body in an axial direction of the fitting.

7. The permanent joint according to claim 1, wherein the base body and supporting body are constructed as two parts.

* * * * *